June 14, 1949. C. KREUTZER 2,473,152
TOOL FOR REAPING ASPARAGUS AND THE LIKE
Filed Nov. 21, 1946 2 Sheets-Sheet 1
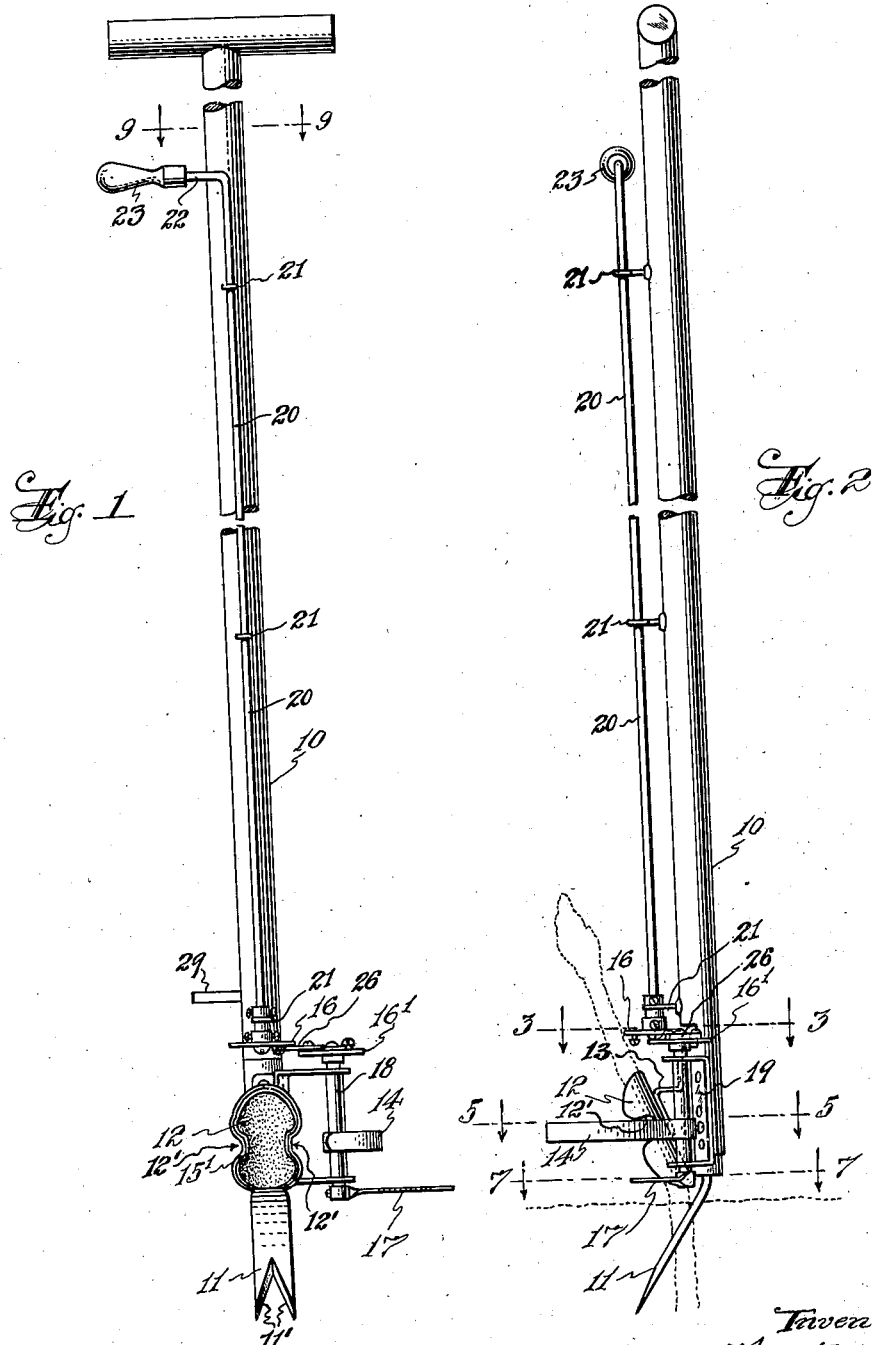

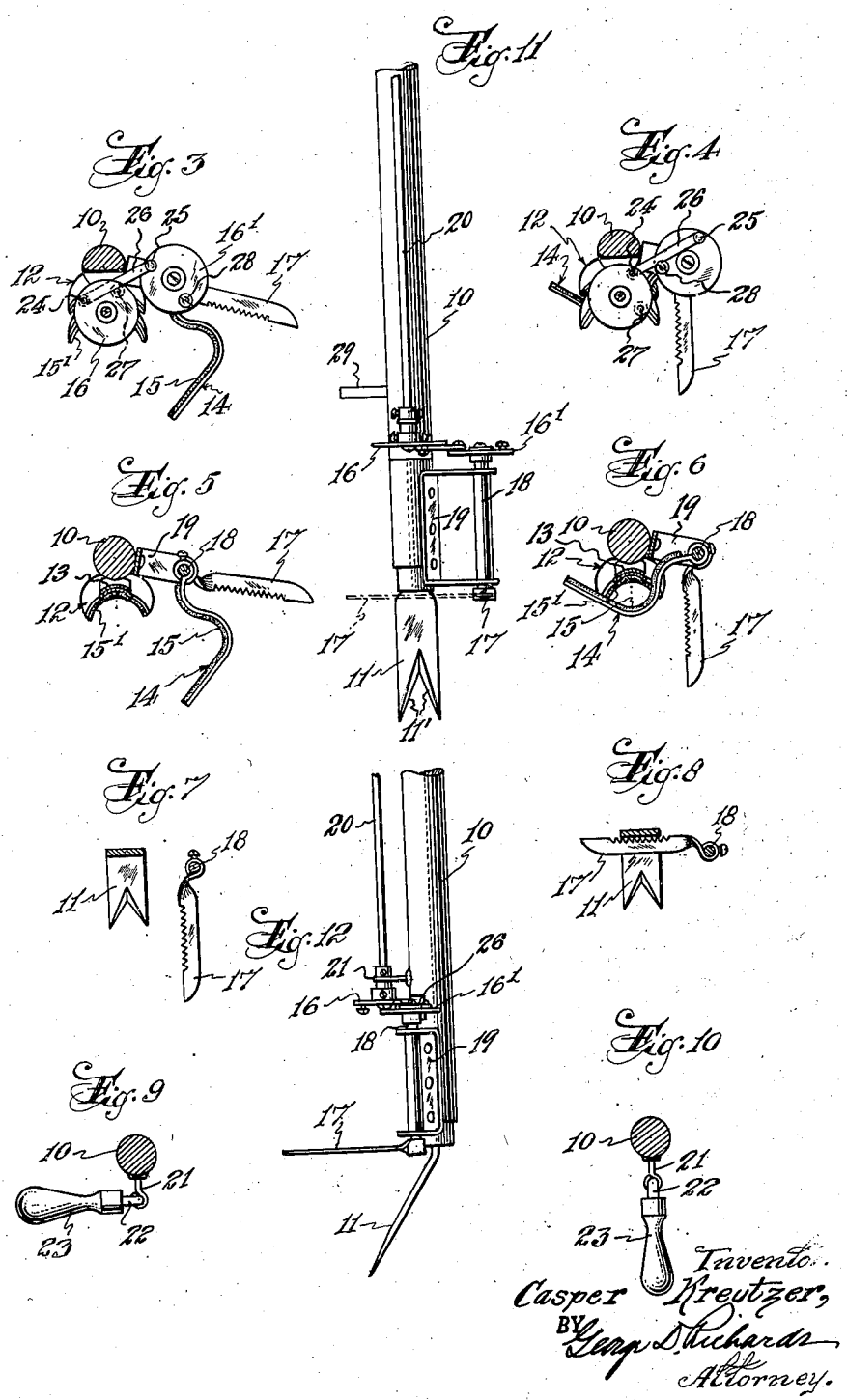

Patented June 14, 1949

2,473,152

UNITED STATES PATENT OFFICE 2,473,152

TOOL FOR REAPING ASPARAGUS AND THE LIKE

Casper Kreutzer, Milltown, N. J.

Application November 21, 1946, Serial No. 711,381

5 Claims. (Cl. 294—50.8)

This invention relates to an improved hand tool for reaping asparagus and similar vegetable growths; and the invention has reference, more particularly, to a novel manipulatable tool for such purpose whereby the reaping operations may be conveniently and rapidly carried on by the user of the tool without requiring arduous repeated stooping or bending of the user's body, and, therefore, with a minimum of physical effort and a maximum of physical ease.

The invention has for an object to provide a novel hand manipulatable tool adapted in use to cut through a stalk of asparagus or other vegetable growth at a point immediately below the surface of the soil from which it protrudes, while at the same time being operable to releasably grasp the stalk or growth without risk of bruising or other injury thereto, whereby the tool may be used to remove the severed stalk or growth from the soil, and then to pass the same to and for deposit in a suitable collecting receptacle.

Other objects of this invention, not at this time more particularly enumerated, will be understood from the following detailed description of the same.

An illustrative embodiment of the invention is shown in the accompanying drawings, in which:

Fig. 1 is a front elevational view of the novel hand tool according to this invention, and Fig. 2 is a side elevational view of the same.

Fig. 3 is a transverse sectional view, taken on line 3—3 in Fig. 2, showing the actuating devices of stalk grasping means of the tool as disposed to set the latter in open condition; and Fig. 4 is a similar view showing said actuating devices disposed to set the stalk grasping means in operative or closed condition.

Fig. 5 is a transverse sectional view, taken on line 5—5 in Fig. 2, showing the stalk grasping means in open condition; and Fig. 6 is a similar view, showing the stalk grasping means in operative or closed condition.

Fig. 7 is a transverse sectional view, taken on line 7—7 in Fig. 2, showing an auxiliary optionally usable gripper arm with which the tool is provided, the same being disposed in an out of service position; and Fig. 8 is a similar view showing said auxiliary gripper arm as disposed in a service position.

Fig. 9 is a transverse sectional view, taken on line 9—9 in Fig. 1, showing the manipulatable handle of the stalk grasping actuating means in initial position; and Fig. 10 is a similar view showing the handle in actuated position.

Fig. 11 is a front elevational view and Fig. 12 is a side elevational view of a modified form of the tool of this invention, wherein the upper part of the handle shaft is broken away.

Similar characters of reference are employed in the above described views, to indicate corresponding parts.

Referring to the drawings, the reference character 10 indicates the handle staff of the tool, to the lower end of which is suitably affixed the cutting blade of the tool. Said cutting blade is formed to provide a flat steel blade body 11, so affixed to the handle staff 10 as to extend obliquely to the axis of the latter, whereby to be downwardly and forwardly inclined. The free end of the blade body 11 is indented by a V-shaped notch, the converging edges of which are sharpened to provide cutting or knife edges 11'.

Affixed to the front of the handle staff 10, adjacently above the cutting blade 11, is an upwardly and outwardly inclined supporting bracket 13, to which is affixed an outwardly open stalk receiving trough 12. The opposite sides of said stalk receiving trough 12 are indented, intermediate the trough ends, to provide clearance notches 12' for the purpose hereinafter referred to.

Affixed to the side of the handle staff 10, to project laterally therefrom, adjacent to one side of said stalk receiving trough 12, is a bearing yoke 19. Journaled in and between the vertically spaced arms of said bearing yoke 19 is a perpendicular rotatable spindle 18. Affixed to said spindle 18, to turn therewith, whereby to be swung laterally toward and from the stalk receiving trough 12 in the plane of its clearance notches 12', is a gripper arm 14. Said gripper arm is provided with an arcuate mid-portion, the open side of which is adapted to oppose the open side of said stalk receiving trough 12. The inner side of said gripper arm 14 is provided with a facing 15 of resilient or relatively soft material, such e. g. as rubber, felt or cork, but preferably the latter. In like manner, the interior of the stalk receiving trough 12 is also provided with a lining or facing 15' of similar resilient or relatively soft material.

Manipulatable means is provided for imparting limited rotary motion to the spindle 18, whereby to swing the gripper arm 14 toward and from the stalk receiving trough 12. This means comprises a shaft 20 which is supported to extend along and parallel to the handle staff 10 above the stalk receiving trough 12. The handle staff 10 has affixed thereto, at suitable longitudinally spaced intervals, bearing eyes 21 by which the shaft 20 is rotatably supported. At its upper end, said shaft 20 terminates in an angularly extending lever arm 22, to the free end of which is affixed a handle member 23 by which the shaft 20 may be turned. Secured to the lower end of said shaft 20, so as to turn therewith, is a driver crank disk or wheel 16. Similarly, secured to the upper end of the spindle 18, so as to turn therewith, is a driven crank disk or wheel 16'. The crank pin 24 of the driver crank disk or wheel 16 is connected to the crank pin 25 of the driven crank disk or wheel 16' by a link 26. The driver crank disk or wheel 16 is provided with a stop pin 27, which, when said driver crank disk or wheel 16 is turned in counterclockwise direction, by engagement with the link 26 limits the rotary motion of the crank disks or wheels 16 and 16' in that diretcion. Similarly, the driven crank disk or wheel 16' is provided with a stop pin 28, which, when said crank disk or wheel 16' is turned in clockwise direction, by engagement with the link 26 limits the rotary motion of the crank disks or wheels 16 and 16' in the opposite direction.

Affixed to the handle staff 10 adjacent its lower end, so as to project laterally therefrom, is a foot engageable thrust member 29.

Adjustably mounted on the lower end of the spindle 18 so as to turn therewith, is an auxiliary and optionally usable gripper jaw piece 17, the use of which will be subsequently explained.

When using the tool as an asparagus reaping aid, the operator manipulates the means for actuating the gripper arm 14 so as to swing the same outward to an initial open position (see Figs. 3 and 5 more particularly). After the tool is so conditioned, the end of the cutting blade 11 is applied to the soil in close proximity to an asparagus stalk desired to be cut and removed, in such manner that the stalk will be straddled by the V-shaped cutting edges 11' of the blade. The tool being thus positioned, by a downward thrust upon the handle staff 10, which may be aided by a down-forcing application of the operator's foot to the thrust member 29, said cutting blade 11 is caused to pass obliquely downward through the soil, whereby to pass the cutting edges 11' through the stalk, at a point thereof adjacently below the soil surface, whereby to shear through the stalk and thus sever the same from the root section thereof. After the stalk has been thus severed, the upwardly extending exterior portion of the stalk will be engaged in and bent slightly forward by the stalk receiving trough 12 of the tool, whereupon the gripper arm 14 is actuated to swing the same across the thus engaged stalk so as to grip the latter between said trough 12 and said gripper arm. The gripper arm 14, is thus actuated by manipulating the lever arm 22 so as to rotate the shaft 20 and thereby the driver crank disk or wheel 16 in clockwise direction. Corresponding motion is transmitted from the driver crank disk or wheel 16 to the driven crank disk or wheel 16' by the connecting link 26, and thus to the spindle 18 and gripper arm 14, to cause the latter to close across the stalk receiving trough 12 in gripping and holding relation to the stalk lodged therein. Owing to the provision of the clearance notches 12' with which the sides of the stalk receiving trough are provided, the gripper arm 14, by entrance therein, is free to adjust itself to and operatively grip and hold the stalk whether the latter is thin or thick, i. e. regardless of its cross-sectional or diametric size.

After the stalk is thus severed and gripped, the tool may be manipulated to withdraw the stalk from the soil, and then to convey the same to a suitable collecting receptacle in which it may be dropped by swinging back and opening the gripper arm 14; the latter being so actuated by effecting a reverse or counter clockwise rotation of the shaft 20 and crank disks or wheels 16 and 16'.

From the above description it will be understood that a very handy and efficient tool for cutting asparagus is provided, which is easily and quickly manipulatable, and the use of which relieves the operator from necessity for repeated stooping, thus reducing to a minimum the physical exertion incident to the work of asparagus reaping or harvesting.

It may be desired to utilize the tool for purposes other than that of asparagus reaping for which it is especially designed and constructed, such e. g. as for removing dandelion and similar weed growths from lawns. To the latter end the additional gripper jaw piece 17 is provided. When the tool is used for asparagus reaping, this gripper jaw piece 17 is adjusted on the spindle 18 so as to be in a position in which it will not reach and engage with the blade 11 when the spindle 18 is rotated to close the gripper arm 14 relative to the stalk receiving trough 12, and thus so as to be inoperative under such conditions (see Figs. 3 to 6 inclusive). When the use of the tool is desired for cutting and pulling weeds, the gripper jaw piece 17 is loosened and rotated on the end of the spindle 18 and then again made fast thereof in such position that, when the gripper arm 14 is in-swung, said gripper jaw piece 17 will be likewise in-swung so as to engage and grip a weed operated upon between the same and the upper end of the blade 11, so that, on severance of the weed root by the blade, the weed may be pulled out and away. To increase the gripping efficiency of said gripper jaw piece, its operative edge may be provided with serrations or gripping teeth as shown.

If desired, the tool may be provided in a form suitable for use only as a weeder, in which case the stalk receiving trough 12 and cooperating gripper arm 14 may be removed, and the gripper jaw piece 17 alone provided (see Figs. 11 and 12).

Having now described my invention, I claim:

1. A tool for the purposes described comprising a handle staff, a cutting blade affixed to the lower end of said handle staff, a stalk receiving trough affixed to the handle staff adjacently above the cutting blade, a bearing yoke also affixed to said handle staff to project laterally therefrom adjacent to said trough, a spindle journaled in said bearing yoke, a gripper arm fixed on said spindle so as to be swung by rotary movement thereof transversely across said trough, a shaft rotatably mounted on and parallel to said handle staff, said shaft having a lever arm at its upper end for rotating the same, a driver crank wheel fixed on the lower end of said shaft, a driven crank wheel fixed on said spindle, and a transmission link interconnecting said crank wheels.

2. A tool for the purposes described as defined in claim 1, wherein a lining of cushioning material is affixed to the interior of said trough, and a facing of cushioning material is affixed to the inner side of said gripper arm.

3. A tool for the purposes described as defined in claim 1, wherein the sides of the stalk receiving trough are provided with indented clearance notches in the plane of said gripper arm, and said gripper arm having in its mid-portion an outwardly bowed section for opposition to said trough.

4. A tool for the purposes described as defined in claim 1, wherein the sides of the stalk receiving trough are provided with indented clearance notches in the plane of said gripper arm, said gripper arm having in its mid-portion an outwardly bowed section for opposition to said trough, a lining of cushioning material affixed to the interior of said trough, and a facing of cushioning material covering at least the interior of the bowed section of said gripper arm.

5. In a tool for the purposes described as defined in claim 1, a gripper jaw piece adjustably mounted on said spindle and adapted to be swung, when in an operative adjusted position, by rotary movement of said spindle transversely across and in opposition to the upper portion of said cutting blade.

CASPER KREUTZER.

REFERENCES CITED

The following references are of record in the file of this patent:

UNITED STATES PATENTS

| Number | Name | Date |
|---|---|---|
| 492,721 | Garnett | Feb. 28, 1893 |
| 772,097 | Hayes | Oct. 11, 1904 |
| 1,835,293 | Fougstedt et al. | Dec. 8, 1931 |